April 24, 1962 T. H. PEIRCE 3,031,179
SUSPENSION SYSTEM
Filed Aug. 17, 1959 2 Sheets-Sheet 1
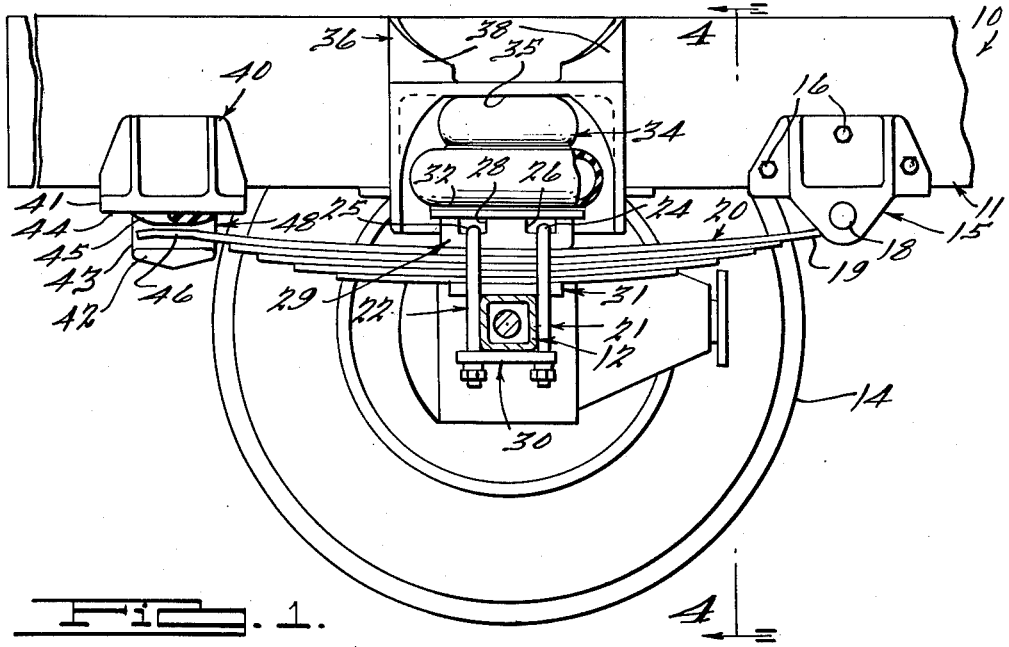
FIG. 1.
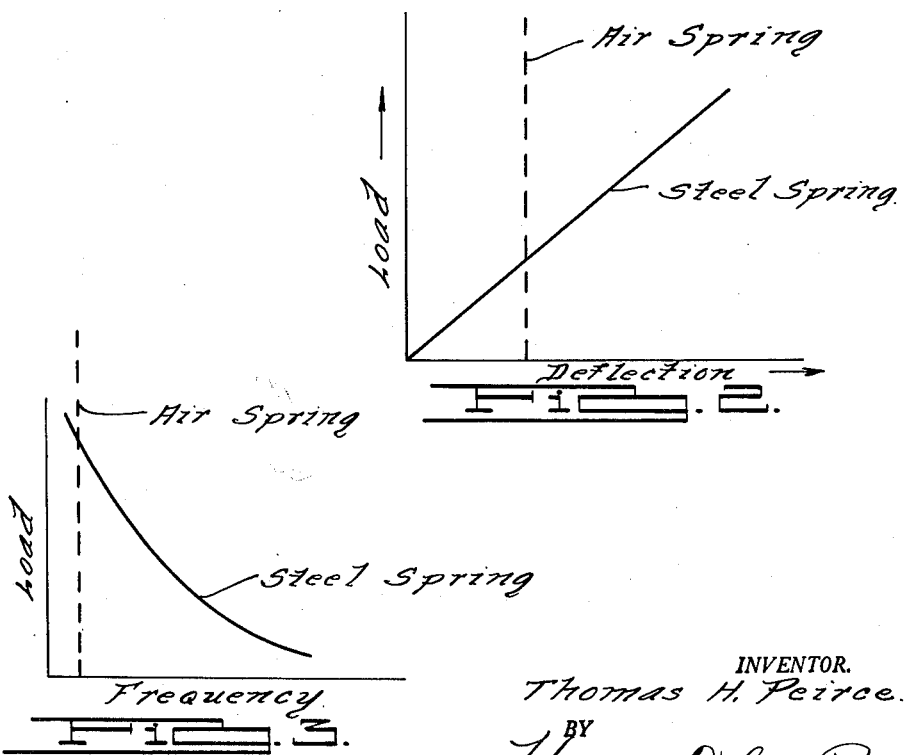
FIG. 2.
FIG. 3.
INVENTOR.
Thomas H. Peirce.
BY
Harness, Dickey & Pierce
ATTORNEYS.

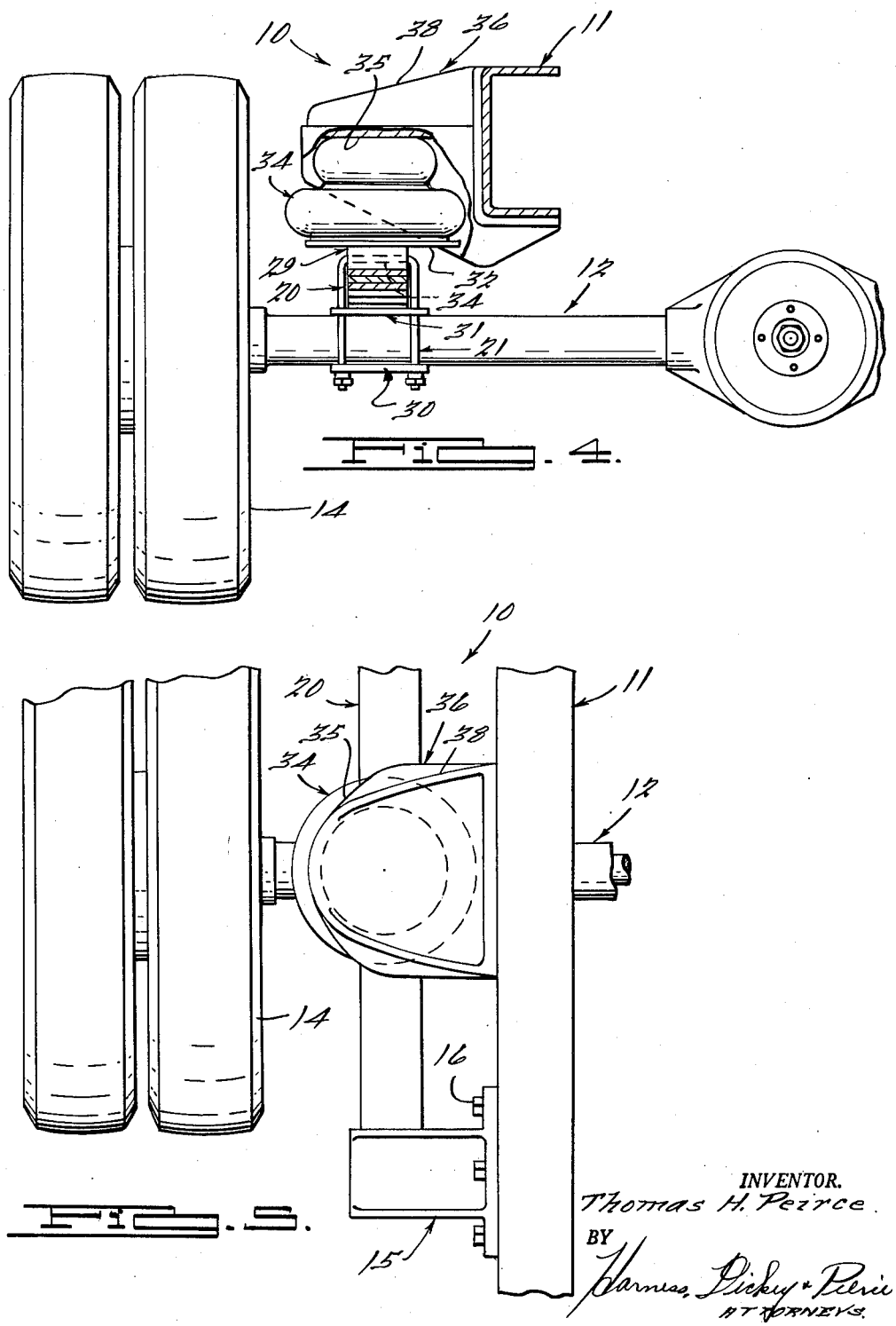

United States Patent Office 3,031,179
Patented Apr. 24, 1962

3,031,179
SUSPENSION SYSTEM
Thomas H. Peirce, 16725 Shaftsbury, Detroit, Mich.
Filed Aug. 17, 1959, Ser. No. 834,310
5 Claims. (Cl. 267—31)

This invention relates generally to a suspension system for a wheeled vehicle, and more particularly to a novel air and metal spring suspension system.

Characteristically, wheeled vehicles designed to carry heavy pay loads are relatively hard riding when running in the unloaded condition. The hard ride is due primarily to the relatively high rate springs required by such a vehicle to support heavy loads which, upon excitation, transmit vibration to the vehicle frame. Such vibration accelerates fatigue of the vehicle components and results in driver discomfort. For example, the breaker strips on cement highways are often capable of exciting such springs, causing them to vibrate at a natural frequency, dependent upon loading, road speed, and other variable conditions, which vibration is transmitted to the vehicle. Such vibration, in addition to having a deleterious effect on both the vehicle and the operator, results in excessive pitching and bouncing, making the vehicle hard to control.

It has heretofore been proposed to use auxiliary springs having a relatively low spring rate to dampen the high rate springs required to support heavy loads. The low rate springs aid in absorbing road shocks and sharp bumps, thereby smoothing out the vehicle ride. However, such suspension systems generally have a mechanical connection between the high rate springs and the vehicle which, when the high rate springs are excited, results in the aforementioned vibratory condition with its inherent deleterious effects.

The present invention is directed to a novel suspension system wherein heavy loads are supported by a primary spring suspension, and relatively light loads by a secondary spring system, there being no vibration transmitting mechanical connection between the vehicle and the primary system under light load conditions.

Accordingly, it is one object of the present invention to provide an improved spring suspension system for a wheeled vehicle.

Another object of the present invention is to provide a combination high and low rate spring suspension system for a wheeled vehicle.

Another object is to provide a metal and air spring suspension for a wheeled vehicle wherein the air suspension supports the vehicle in the unloaded condition, and the metal spring suspension supports the vehicle in the loaded condition.

Another object of the present invention is to provide a novel means of suspending a metal leaf spring so as to utilize the metal spring only when a vehicle is heavily loaded.

Other objects and advantages of the present invention will become obvious from a study of the following specification, wherein reference is made to the drawings, in which:

FIGURE 1 is a fragmentary side elevational view, partially in section and partially broken away, of a vehicle equipped with a suspension system constructed in accordance with the instant invention;

FIG. 2 is a chart showing the load versus deflection of a metal leaf spring and the cutoff point of the air spring;

FIG. 3 is a graph of a load versus frequency of a metal spring and the cutoff point of the air spring;

FIG. 4 is a fragmentary rear elevational view, partially in section, of the air and metal spring suspension system of the present invention; and FIG. 5 is a fragmentary top view of the suspension system of the present invention.

A spring suspension 10 is shown operatively related with the frame 11 of a wheeled vehicle (not shown). The vehicle has a drive train comprising a rear axle 12 and a plurality of wheels 14.

A front hanger 15 is secured to the frame 11 as by a plurality of bolts 16. The hanger 15 has a transversely extending pin 18 for the support of an end portion 19 of a metal leaf spring 20. The leaf spring 20 is secured to the transversely extending axle 12 by a pair of U-bolts 21 and 22 having bight portions 24 and 25, respectively, extending through a pair of suitable cutouts 26 and 28 in a leaf spring saddle 29. The U-bolts 21 and 22 extend through suitable holes in a bottom plate 30 that underlies the axle 12 and, in conjunction with a top plate 31 that is interposed between the leaf spring 20 and the axle 12 to provide a relatively large bearing surface for the spring 20 on the axle 12, rigidly secure the spring 20 to the axle 12.

The spring saddle 29 also has a support plate 32 for an air spring 34. The air spring 34 comprises a resilient enclosure that may be provided with means for varying the air pressure therein to accommodate different unloaded vehicle weights if so desired. The air spring 34 is substantially enclosed by and is engageable at its upper end with a transversely extending plate 35 on an air spring saddle 36. The air spring saddle 36 has a plurality of strengthening ribs 38 and is secured to the vehicle frame 11 as by welding.

In accordance with the present invention, a rear fixture 40 is secured to the frame 11 as by welding. The rear fixture 40 has upper and lower horizontally extending, vertically spaced plates 41 and 42, respectively, connected by a vertical portion 43, a bottom surface 44 of the upper plate 41 being provided with a rubber bumper 45. A free end portion 46 of the leaf spring extends between the bumper 45 and the lower plate 42 of the fixture 40 so as to be engageable with the bumper 45 when certain conditions of vehicle loading obtain.

When the vehicle is running light, or, in other words, in the unloaded condition, the weight thereof is supported in its entirety by the air spring 34, the free end 46 of the metal leaf spring 20 being freely interposed between the rubber bumper 45 and the bottom plate 42 of the fixture 40. As shown in FIG. 1, a gap 48 exists between the free end 46 of the leaf spring 20 and the rubber bumper 45. Further, because the leaf spring 20 does absorb torque reaction, the suspension system 10 does not require torque rods. Also, because the free end 46 is restrained from transverse movement with respect to the frame 11, by the vertical portion 43 of the fixture 40, the rear axle 12 is positively located. Therefore, the suspension system 10 precludes the possibility of rear wheel steering.

Referring to FIG. 2, a graph of load versus deflection shows the deflection of the steel leaf spring 20 to be relatively linear under varying load. When the load and deflection are relatively small, the weight of the vehicle is supported by the air spring 34. This is shown graphically by a vertical dotted line on the graph, all loading conditions to the left of the line being carried by the air spring 34, with the steel spring 20 becoming effective to carry load only when the load reaches a point on the spring deflection curve to the right of the point of intersection of the dotted line and the steel spring curve.

Referring to FIG. 3 a graph of load versus frequency of vibration of a steel spring is shown in conjunction with a dotted line showing the point at which the air spring 34 assumes the load. Any loading condition that would normally result in a vibratory frequency to the right of the dotted line is assumed by the air spring 34. This, in essence, means that the steel spring 20 is never excited or permitted to transmit vibrations to the frame 11 at relatively high frequencies. It is these relatively high frequency vibrations that lead to rough riding, fatigue of the metal parts of the vehicle, and driver discomfort.

Upon loading of the vehicle, the air spring 34 is collapsed, bringing the free end 44 of the leaf spring 20 into contact with the rubber bumper 45 so that the leaf spring 20 is stressed, thereby absorbing the load of the vehicle. It is to be noted that these relatively heavy load conditions fall to the left of the dotted line in the graph of FIG. 3, in which range the spring 20 has a relatively low natural frequency of vibration.

The present suspension system has an ideal spring rate at all loading conditions, resulting in increased driver comfort and increased vehicle life.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A spring suspension system for a wheeled vehicle having a frame, said suspension comprising an axle, a high rate lead spring having one end shackled to said frame and the other end normally free, a pneumatic low rate spring, one end of said low rate spring and said axle being secured to said high rate leaf spring at a point intermediate said one end and the normally free end thereof, the other end of said low rate spring being connected to said frame, and means secured to said frame adjacent said free end of said high rate spring and normally disengaged from said high rate spring for engaging said free end upon collapse of said low rate spring due to loading of said vehicle whereby the free end of said high rate spring is connected to said vehicle only when said vehicle is relatively heavily loaded.

2. A suspension system for a wheeled vehicle having a frame, said suspension system comprising an axle, a high rate metal leaf spring having one end shackled to said frame and the other end normally free, a low rate pneumatic spring, one end of said low rate spring and said axle being secured to and extending between said high rate spring at a point intermediate said one end and the free end thereof, the other end of said low rate spring being connected to said frame, and a rubber bumper secured to said frame above the free end of said high rate spring for engaging said free end upon collapse of said low rate spring whereby the free end of said high rate spring is unstressed when said vehicle is unloaded and is engaged by said bumper and therefore stressed when said vehicle is relatively heavily loaded.

3. A suspension system for a wheeled vehicle having a frame, said suspension system comprising an axle, a high rate metal leaf spring having one end shackled to said frame, an air spring and said axle secured to said leaf spring at a point intermediate said one end and a free end thereof, said air spring also being secured to said frame, and a fixture secured to said frame including a rubber bumper disposed adjacent to and normally spaced from said free end of said leaf spring for engaging said free end upon collapse of said air spring whereby the free end of said leaf spring is connected to said vehicle only when said vehicle is relatively heavily loaded.

4. A suspension system for a wheeled vehicle having a frame, said suspension system comprising an axle, a high rate metal leaf spring having one end shackled to said vehicle, an air spring and said axle secured to said leaf spring at a point intermediate said one end and a free end thereof, and a fixture secured to said frame having a pair of vertically spaced horizontally extending plates connected by a vertically extending member, said free end of said leaf spring being normally disposed between and disengaged from said plates and engageable with the upper one of said plates upon collapse of said air spring whereby the free end of said leaf spring is unstressed when said vehicle is relatively lightly loaded and stressed when only said vehicle is relatively heavily loaded.

5. A suspension system for a wheeled vehicle having a frame, said suspension system comprising a metal leaf spring having one end shackled to said frame and a free end, an air spring secured to and disposed above said leaf spring at a point intermediate said one end and the free end thereof and to said frame, an axle secured to the bottom side of said leaf spring directly under said air spring, and a rubber bumper secured to said frame adjacent the free end of said metal leaf spring for engaging said free end upon collapse of said air spring due to loading of said vehicle whereby said metal spring is stressed only when said vehicle is relatively heavily loaded.

References Cited in the file of this patent

UNITED STATES PATENTS

| | | |
|---|---|---|
| 1,436,144 | Bernat | Nov. 21, 1922 |
| 2,481,817 | Bradley et al. | Sept. 13, 1949 |
| 2,776,135 | Assmus | Jan. 1, 1957 |
| 2,802,663 | Hovind | Aug. 13, 1957 |
| 2,874,956 | La Belle | Feb. 24, 1959 |

FOREIGN PATENTS

| | | |
|---|---|---|
| 524,287 | Great Britain | Aug. 2, 1940 |